(12) United States Patent
Baughman

(10) Patent No.: US 8,777,554 B2
(45) Date of Patent: Jul. 15, 2014

(54) INTERMEDIATE FAN STAGE

(75) Inventor: John Lewis Baughman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 704 days.

(21) Appl. No.: 12/870,423

(22) Filed: Aug. 27, 2010

(65) Prior Publication Data

US 2011/0150633 A1   Jun. 23, 2011

Related U.S. Application Data

(60) Provisional application No. 61/288,362, filed on Dec. 21, 2009.

(51) Int. Cl.

| F04D 27/02 | (2006.01) |
|---|---|
| F04D 29/18 | (2006.01) |
| F01D 5/22 | (2006.01) |
| F01D 17/00 | (2006.01) |
| F03B 15/02 | (2006.01) |
| F01D 1/24 | (2006.01) |
| F01D 13/00 | (2006.01) |
| F04D 1/08 | (2006.01) |
| F02K 3/02 | (2006.01) |

(52) U.S. Cl.
USPC ........ 415/1; 415/26; 415/49; 415/68; 415/83; 415/160; 416/120; 416/129; 416/189; 416/193 R; 60/226.1; 60/226.3

(58) Field of Classification Search
CPC ............ F02K 3/02; F02K 3/04; F02K 3/062; F02K 3/065; F02K 3/072; F02K 3/075; F02K 3/077; F04D 3/00; F04D 15/0016; F04D 19/007; F04D 19/026; F04D 19/022; F04D 29/326; F01D 1/023; F01D 5/022; F01D 5/225; F01D 5/22; F01D 17/162
USPC ................ 415/60, 68, 69, 83, 84, 160, 208.1, 415/146–147, 1, 26, 29, 47, 49–50; 416/120, 124, 128, 129, 189, 193 R; 60/226.1, 226.3, 262
See application file for complete search history.

(56) References Cited

U.S. PATENT DOCUMENTS

| 4,548,034 | A | * | 10/1985 | Maguire | 60/262 |
|---|---|---|---|---|---|
| 5,402,638 | A | * | 4/1995 | Johnson | 60/204 |
| 5,404,713 | A | * | 4/1995 | Johnson | 60/204 |
| 5,809,772 | A | * | 9/1998 | Giffin et al. | 60/226.1 |
| 5,988,980 | A | * | 11/1999 | Busbey et al. | 416/193 R |
| 6,901,739 | B2 | * | 6/2005 | Christopherson | 60/226.3 |
| 7,188,467 | B2 | * | 3/2007 | Johnson | 60/226.1 |
| 7,246,484 | B2 | * | 7/2007 | Giffin et al. | 60/268 |
| 2007/0186535 | A1 | * | 8/2007 | Powell et al. | 60/226.1 |
| 2010/0180572 | A1 | * | 7/2010 | Wadia et al. | 60/226.1 |

* cited by examiner

*Primary Examiner* — Ned Landrum
*Assistant Examiner* — Su Htay
(74) *Attorney, Agent, or Firm* — William Scott Andes; Trego, Hines & Ladenheim, PLLC

(57) ABSTRACT

A fan system is disclosed having a forward fan stage configured to pressurize an airflow and an aft fan stage having a tip-fan configured to pressurize a first portion of a pressurized air flow from the forward fan stage wherein the aft fan stage is driven by a second portion of the pressurized airflow.

18 Claims, 2 Drawing Sheets

INTERMEDIATE FAN STAGE

CROSS-REFERENCE TO RELATED APPLICATIONS

This Application claims priority to U.S. Provisional Application Ser. No. 61/288362, filed Dec. 21, 2009, which is herein incorporated by reference in its entirety.

BACKGROUND OF THE INVENTION

This invention relates generally to gas turbine engines, and, more specifically, to a gas turbine engine with an intermediate pressure fan stage having a tip fan located on a blade driven by a pressurized airflow.

In a turbofan aircraft gas turbine engine, air is pressurized in a fan module, an optional booster module and a compression module during operation. A portion of the air passing through the fan module is passed into a by-pass stream and used for generating a portion of the thrust needed for propelling an aircraft in flight. The air channeled through the optional booster module and compression module is mixed with fuel in a combustor and ignited, generating hot combustion gases which flow through turbine stages that extract energy therefrom for powering the fan, booster and compressor rotors. The fan, booster and compressor modules have a series of rotor stages and stator stages. The fan and booster rotors are typically driven by a low-pressure turbine (LPT) and the compressor rotor is driven by a high-pressure turbine (HPT). The fan and booster rotors are aerodynamically coupled to the compressor rotor although the fan rotor and compressor rotor normally operate at different mechanical speeds.

It is often desirable to use an engine core comprising the compressor, combustor, high-pressure turbine (HPT) and low-pressure turbine (LPT) from a high bypass commercial engine or a medium bypass engine with a moderate fan pressure ratio as a building block for lower bypass ratio engines with higher fan pressure ratios. The boost pressure and temperature into the high-pressure compressor (HPC) is usually significantly higher in the low-bypass derivative engine than in the original high-bypass engine. This typically requires that the maximum operating airflow in the core be limited below its full design corrected airflow capacity due to mechanical limitations of the maximum physical core speed and/or the maximum compressor discharge temperature capability of the core. It is desirable to find a way to operate the original engine core airflow at its full potential while significantly increasing the fan pressure ratio to the bypass stream to maximize the thrust potential of the derivative engine.

Accordingly, it would be desirable to have a fan system that makes it possible to operate the original engine core near its full airflow capability while significantly increasing the fan pressure ratio to the bypass stream to maximize the thrust potential of the derivative engine.

BRIEF DESCRIPTION OF THE INVENTION

The above-mentioned need or needs may be met by exemplary embodiments which provide a fan system having a forward fan stage configured to pressurize an airflow and an aft fan stage having a tip-fan configured to pressurize a first portion of a pressurized air flow from the forward fan stage wherein the aft fan stage is driven by a second portion of the pressurized airflow.

In one aspect of the invention, the aft fan stage rotates independently from the forward fan stage.

In another aspect of the invention, the aft fan stage has an air turbine blade comprising a turbine airfoil adapted to extract energy from a pressurized flow of air and a tip-fan blade adapted to pressurize a flow of air.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
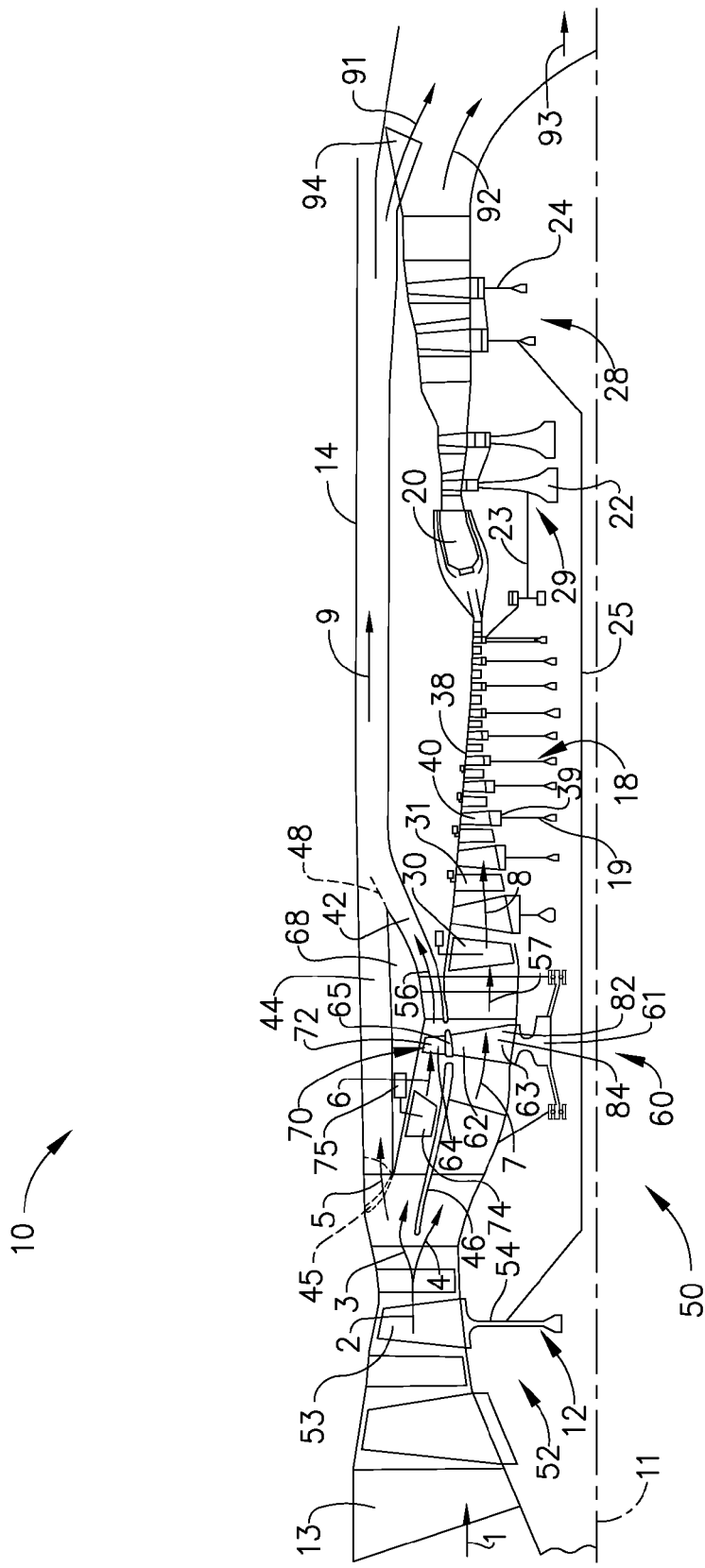
FIG. 1 is a schematic cross-sectional view of a portion of a gas turbine engine with an exemplary embodiment of an intermediate fan stage according to the present invention.

Referring to the drawings wherein identical reference numerals denote the same elements throughout the various views, FIG. 1 shows an exemplary turbofan gas turbine engine 10 incorporating an exemplary embodiment of the present invention. The exemplary gas turbine engine 10 comprises an engine centerline axis 11, a fan 12 which receives an inflow of ambient air 1, an optional booster or low-pressure compressor (LPC) (not shown in FIG. 1), a high-pressure compressor (HPC) 18, a combustor 20 which mixes fuel with the air pressurized by the HPC 18 for generating combustion gases which flow downstream through a high-pressure turbine (HPT) 22, and a low-pressure turbine (LPT) 24 from which the combustion gases are discharged from the engine 10. The HPT 22 is coupled to the HPC 18 using a HPT shaft 23 to substantially form a high-pressure rotor 29. A low-pressure shaft 25 joins the LPT 24 to the fan 12 (and the optional booster if present) to substantially form a low-pressure rotor 28. The second or low-pressure shaft 25 is rotatably disposed co-axially with and radially inwardly of the high-pressure rotor 29. The low-pressure rotor 28 and the high-pressure rotor 29 are aerodynamically coupled but rotate independently since they are not mechanically coupled.

The HPC 18 that pressurizes the air flowing through the core has a rotor 19 that rotates about the longitudinal centerline axis 11. The HPC system includes a plurality of inlet guide vanes (IGV) 30 and a plurality of stator vanes 31 arranged in a circumferential direction around the longitudinal centerline axis 11. The HPC 18 further includes multiple rotor stages 19 which have corresponding rotor blades 40 extending radially outwardly from a rotor hub 39 or corresponding rotors in the form of separate disks, or integral blisks, or annular drums in any conventional manner. The high-pressure rotor 29 is supported in the engine static frames using known support methods using suitable bearings.

Cooperating with each rotor stage 19 is a corresponding stator stage comprising a plurality of circumferentially spaced apart stator vanes 31. An exemplary arrangement of stator vanes and rotor blades for an axial flow high-pressure compressor 18 is shown in FIG. 1. The rotor blades 40 and stator vanes 31 define airfoils having corresponding aerodynamic profiles or contours for pressurizing a core airflow 8 successively in axial stages. The rotor blades 40 rotate within an annular casing 38 that surrounds the rotor blade tips. In operation, pressure of the core air flow 8 is increased as the air decelerates and diffuses through the stator and rotor airfoils.

FIG. 1 shows a fan system 50 comprising a forward fan stage 52 that pressurizes an airflow 1. The pressurized airflow 2 exits axially aft from the forward fan stage 52. A static annular splitter 46 that is coaxial with the centerline axis 11 is located axially aft from the forward fan stage 52. The annular splitter 46 divides the pressurized airflow 2 into a first portion 3 and a second portion 4, as shown in FIG. 1.

The fan system 50 has an aft fan stage 60 that is located axially aft from the annular splitter 46. The aft fan stage 60 comprises an aft fan rotor 61 and has a circumferential row of aft fan blades 62. The aft fan stage 60 rotates about the centerline axis 11 but it is not mechanically coupled with the high-pressure compressor 18 or the forward fan stage 52. Although the aft fan stage 60 is aerodynamically coupled during operation of the engine 10 to the forward fan stage 52 and the forward stages of the high-pressure compressor 18, the aft fan stage 60 rotates mechanically independently from the low-pressure rotor 28 and the high-pressure rotor 29. Thus, the aft fan stage 60 rotates independently from the forward fan stage 52 that is located upstream from it.

As shown in FIG. 1, the aft fan stage 60 comprises a row of aft fan blades 62 arranged circumferentially around the longitudinal axis 11. Each aft fan blade 62 has a radially inner portion 63 and an outer portion 64. The radially inner portion 63 of the aft fan blade 62 is configured to be driven as an air-turbine blade 82 that can extract energy from a pressurized airflow 7 that enters the inner portion 63. Known air-turbine airfoil shapes can be used in the construction of the inner portion 63 aft fan blade 62. As the airflows over the inner portion 63, it expands to form an outflow 57 of air that has a lower pressure and lower temperature and imparts energy to the aft fan blades 62 to drive the aft fan stage 60.

As shown in FIG. 1, each aft fan blade 62 has an outer portion 64 and an arcuate shroud 65 between the inner portion 63 and the outer portion 64. The outer portion 64 of the aft fan blade 62 is configured to be a tip-fan blade 72 that can pressurize an inflow of air 6. The arcuate shroud 65 supports the tip-fan blade 72. The outer portion of the aft fan blade 62 has known airfoil shapes for fan blades that can pressurize an inflow of air 6. In the assembled state of the aft fan stage 60, the arcuate shroud 65 of each blade 62 abuts the arcuate shrouds of the circumferentially adjacent fan blades 62 to form an annular platform and a tip-fan 70 comprising the tip-fan blades 72. In one embodiment, each aft fan blade 62 has one tip-fan blade 72 supported by the arcuate shroud 65. In alternative embodiments, each aft fan blade 62 may have a plurality of tip-fan blades 72 supported by the arcuate shroud 65.

As shown in FIG. 1, the aft fan stage 60 has a tip-fan 70 configured to pressurize a first portion 3 of a pressurized air flow 2 from the forward fan stage 52. The tip-fan 70 is driven by the aft blade inner portion 63 that acts as an air turbine blade 82. The aft fan stage 60, with the tip-fan 70, is driven by a second portion 4 of the pressurized airflow 2. The inner portion 63 of the aft fan blade 62 is configured to work as an air-turbine blade that can extract energy from a pressurized air stream whereas the outer portion 64 of the aft fan blade 62 is configured to be a compression-type airfoil that can pressurize an airflow. The inner portion 63 is an air turbine blade 82 having a turbine-type airfoil 84 adapted to extract energy from a pressurized flow of air. The outer portion 64 of the aft fan blade 62 is alternatively referred to herein as a tip-fan blade 72. The tip-fan blade 72 is capable of pressuring a flow of air 6 to create a pressurized tip flow 56 (see FIG. 1).

As shown in FIG. 1, the fan system 50 further comprises a circumferential row of inlet guide vanes (IGV) 74 that are located axially forward from the tip-fan 70 of the aft fan stage 60. The IGVs 74 have known airfoil shapes that can re-orient an incoming airflow 3 to be an airflow 6 that suitably enters the tip-fan 70 for further pressurization. The IGVs 74 are suitably supported by an inner casing 68 (see FIG. 1) and/or by the splitter 46. For enhanced control of the operation of the aft fan stage 60, the fan system 50 may have inlet guide vanes 74 that have variable vanes configured to modulate a flow of air 6 to the tip-fan 70. The amount and orientation of the airflow 6 that is directed to the tip-fan 70 can be varied by suitably moving a portion of the IGVs 74 to vary the stagger angles using known actuators 75.

Figure 2:
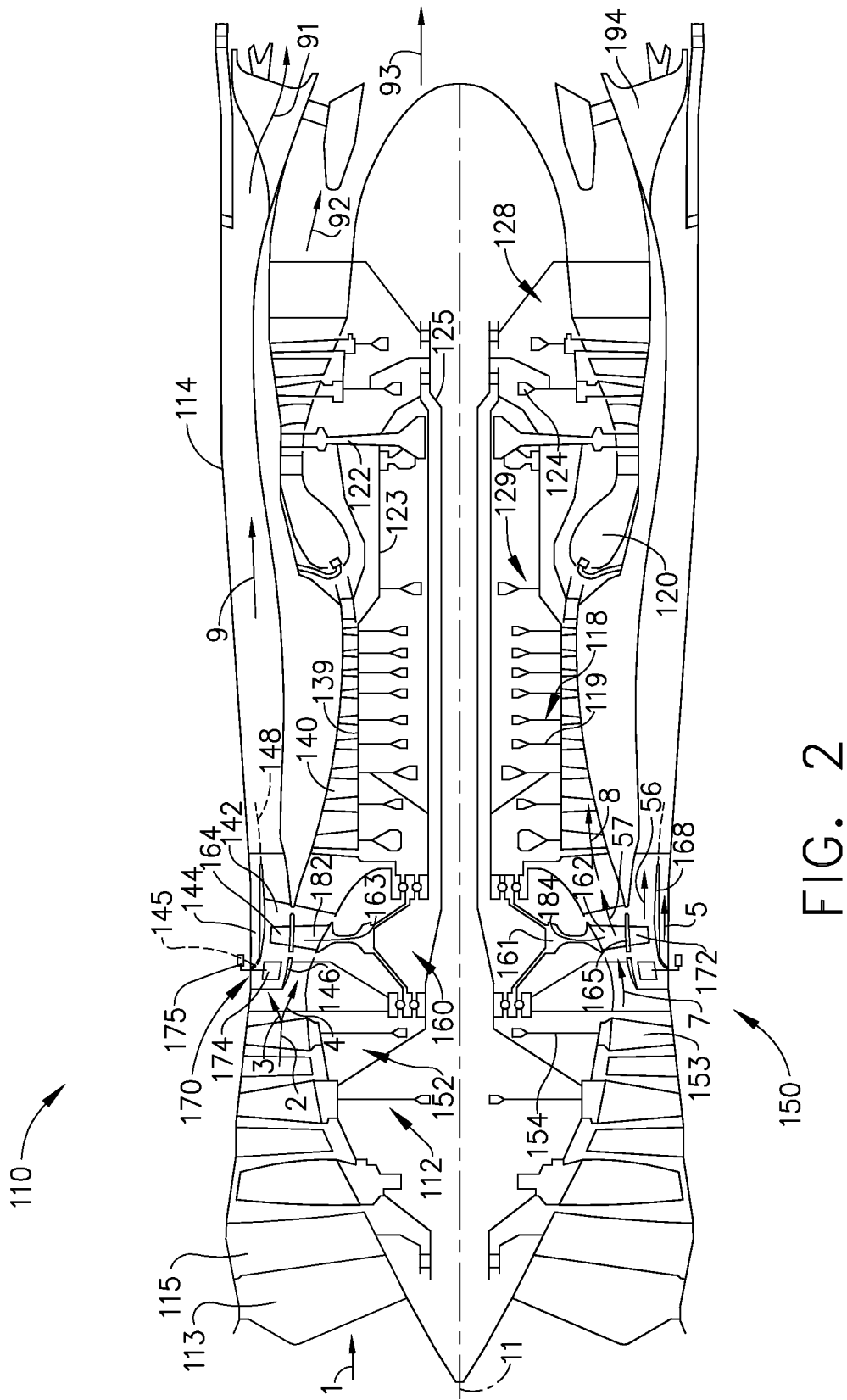
FIG. 2 is a schematic cross-sectional view of an exemplary gas turbine engine according to the present invention having an exemplary embodiment of an intermediate fan stage.

FIG. 2 shows an exemplary embodiment of a gas turbine engine 110 comprising a multistage fan 112 having multiple forward fan stages 152 configured to pressurize an airflow 1. Although three forward fan stages 152 are shown in the exemplary engine 110 shown in FIG. 2, any suitable number of forward fan stages for a particular application can be selected. The forward fan stages pressurize the flow stream 1 entering the fan to generate a pressurized flow stream 2. The forward fan stages are driven by a low-pressure rotor 128 comprising a low-pressure turbine 124 and a low-pressure turbine shaft 125. The gas turbine engine 110 further comprises a compressor 118 driven by a high-pressure rotor 129 having a high-pressure turbine 112 and a high-pressure shaft 123. The HPC 118 has a rotor 19 that rotates about the longitudinal centerline axis 11 and pressurizes the air 8 flowing through the core. The HPC system includes a plurality of stator vanes arranged in a circumferential direction around the longitudinal centerline axis 11 (see FIG. 1 for example). The HPC 118 further includes multiple rotor stages 119 which have corresponding rotor blades 140 extending radially outwardly from a rotor hub 139 or corresponding rotors in the form of separate disks, or integral blisks, or annular drums in any conventional manner. The high-pressure rotor 129 is supported in the engine static frames using known support methods using suitable bearings. The high-pressure turbine 122 and low-pressure turbine 124 are driven by combustion gases generated in the combustor 120 that exit as a hot exhaust stream 92.

The exemplary embodiment of a gas turbine engine 110 comprises an annular splitter 146 (see FIG. 2) located axially aft from the axially last forward fan stage 152. The splitter 146 is adapted to bifurcate the pressurized flow stream 2 from the forward fan stage 152 to form the first portion 3 and the second portion 4 of the pressurized flow 2.

The exemplary embodiment of a gas turbine engine 110 comprises an aft fan stage 160 located axially aft from the splitter 146, and axially forward from the compressor 118, as shown in FIG. 2. As shown in FIG. 2, the aft fan stage 160 has a tip-fan 170 configured to pressurize a first portion 3 of a pressurized air flow 2 from the forward fan stage 152. The tip-fan 170 is driven by the aft blade inner portion 163 that acts as an air turbine blade 182. The aft fan stage 160, with the tip-fan 170, is driven by a second portion 4 of the pressurized airflow 2. The inner portion 163 of the aft fan blade 162 is configured to work as an air-turbine blade that can extract energy from a pressurized air stream whereas the outer portion 164 of the aft fan blade 162 is configured to be a compression-type airfoil that can pressurize an airflow. The inner portion 163 is an air turbine blade 182 having a turbine airfoil 184 adapted to extract energy from a pressurized flow of air. The outer portion of the aft fan blade 162 is alternatively referred to herein as a tip-fan blade 172. The tip-fan blade 172 is capable of pressuring a flow of air 6 to create a pressurized tip flow 56 (see FIG. 1 for example). The aft fan stage 160 reduces the pressure and temperature of the pressurized airflow that drives the aft fan stage 160. Known air-turbine airfoil shapes, materials and manufacturing methods can be used in the construction of the inner portion 163 aft fan blade 162. As the air flows over the inner portion 163, it expands to form an outflow 57 of air that has a lower pressure and lower temperature and imparts energy to the aft fan blades 162 to drive the aft fan stage 160.

The exemplary gas turbine engine 110 shown in FIG. 2 further comprises a circumferential row of inlet guide vanes (IGVs) 174 located axially forward from the tip-fan blades 172. Known airfoil shapes, materials and manufacturing methods can be used in constructing the IGVs 174. The IGVs 174 control the volume of flow of air into the tip-fan 170, similar to the arrangement shown in FIG. 1. For enhanced control of the flow of air into the tip-fan 170, the inlet guide vanes 174 are variable vanes that are configured to modulate the flow of air to the tip-fan 70. The amount and orientation of the airflow that is directed to the tip-fan 710 can be varied by varying the stagger angles by suitably moving a portion of the IGVs 174 using known actuators 175.

In one aspect of the present invention, the exemplary gas turbine engine 110 shown in FIG. 2 (and FIG. 1) further comprises an annular inner bypass passage 142 adapted to flow an inner bypass flow 56 and an annular outer bypass passage 144 adapted to flow an outer bypass flow 5. The outer bypass flow 5 passes through the outer bypass passage 144 and is not pressurized by the tip-fan 170. The inner bypass flow 6 (see FIG. 1) is pressurized by the tip-fan 170 and exits as pressurized tip flow 56. A forward mixer 148 located downstream from the aft fan stage 160 is provided to enhance mixing of the higher pressure inner bypass flow 56 and the lower pressure outer bypass flow 5 to form a mixed bypass flow 9 and developing a static pressure balance. Known mixers (alternatively known as Variable Area Bypass Injectors, or VABI, in the art) can be used for the mixer 148. A reverse flow in the outer bypass passage 144 can be prevented by using a known blocker door 145 that is located near the forward area of the outer bypass passage 144. During operation of the engine, the blocker door is operated toward closure when the variable IGV 144 is opened to cause further pressurization by the tip-fan 170. The gas turbine engine 110 further comprises a rear mixer 94 (alternatively known as Variable Area Bypass Injectors, or VABI, in the art) located down-stream from the low-pressure turbine 24 that is adapted to enhance mixing of the hot exhaust 92 from the low-pressure turbine 24 and the relatively cooler bypass air flow stream 91. Known mixers (VABIs) can be used for this purpose. During engine operation, the operability of the forward fan stage 152 and the aft fan stage 160 can be controlled as necessary by suitably scheduling, using known methods, the operation of the variable IGVs 144, blocker door 145, forward mixer 148 and the rear VABI 194.

As shown in FIGS. 1 and 2, the aft fan stage 60, 160 (alternatively referred to herein as an intermediate pressure fan stage or IPFS) is a separate, independently rotating, spool that incorporates a tip-fan 70, 170 unlike the core driven fan stages that are coupled to the core spools known in the art. Further, as described herein, the IPFS has a tip-fan blade 72, 172 in its outer portion and a air turbine blade 82, 182 in the inner portion. The IPFS spool is located between the forward fan 52, 152 and the HPC 18, 118 such that part of the fan air is delivered to the tip of the IPFS where its pressure is further increased by the IPFS tip-fan blade 72, 172 and then delivered to the inner bypass passage 42, 142. The inner portion 4 of the forward fan flow 2 is delivered to the turbine blade 82, 182 in the inner portion of the IPFS where it is expanded to provide the power to drive the fan tip. The flow from the exit of the turbine is delivered to the entrance of the HPC 18, 118. The extraction of energy by the IPFS turbine blade 82, 182 reduces the boost pressure and temperature into the HPC 18, 118 below those at the forward fan exit 52, 152. By judicious choice of forward fan 52, 152 and IPFS tip-fan 70, 170 pressure ratios, the inlet conditions to the high pressure compressor 18, 118 can be matched to the originating (baseline) engine design conditions and maximize the use of the core flow capability by the derivative engine. At the same time the forward fan 52, 152 and IPFS 60, 160 provide the desired higher bypass air pressure for the bypass flow 9.

Cycle studies have shown that the thrust potential for an existing core can be increased up to 20% over a mixed flow turbofan derivative at the same fan airflow size. Temperature levels into the HPC can readily be matched to the original hardware design conditions allowing maximum use of the corrected flow capability within the original core mechanical design limits. Those skilled in the art will recognize that flowpath architecture studies using known methods can be performed to establish the required mounting structure for the IPFS and the aerodynamic design properties of the fan tip and turbine hub. In the exemplary embodiments shown herein, the IPFS is preferably mounted within the fan frame structure, thus requiring no additional main engine frames to mount the additional spool.

Referring to FIGS. 1 and 2, an exemplary method of operating the fan system 50, 150 comprises the following steps. An airflow 1 that is flowing into the fan system 50, 150 is pressurized in a forward fan stage 52, 152 to generate a pressurized flow 2 that exits from the forward fan stage. The pressurized flow 2 is bifurcated to a first portion 3 and a second portion 4 using a suitable means, such as for example, using an annular splitter 46, 146. The first portion 3 of the pressurized airflow 2 is then directed towards a tip-fan 70 of an aft fan stage 60. A portion of the pressurized flow 2 is flown through an outer bypass passage 44, 144 creating an outer bypass flow 5. The aft fan stage 60 rotates independently from the forward fan stage 52. The second portion 4 of the pressurized airflow 2 is directed towards a circumferential row of air-turbine blades 82 of the aft fan stage 60 such that the aft fan stage 60 is driven by the pressurized air. At this time, a higher pressure inflow 7 entering the inner portion 63, 163 of aft fan stage 60 is expanded to a lower pressure outflow 57. During this expansion, the temperature of the expanding air flow in the inner portion 63, 163 of the aft stage 60, 160 drops. Thus, the temperature and pressure of a core flow 8 entering a compressor 18, 118 is reduced.

The exemplary method further comprises the step of pressurizing a flow 6 entering the tip-fan 70, 170 to generate a pressurized tip flow 56 (See FIGS. 1 and 2). The flow of air 6 entering the tip-fan 70 is modulated with an inlet guide vane 74, 174. Specifically, the amount of air flowing through the tip-fan 70, 170 is independently controlled by the inlet guide vanes 74, 174. More specifically, a stagger of the inlet guide vanes 74, 174 is varied to selectively control the quantity of airflow through the tip-fan 70, 170, based on the fan pressure ratio, thrust and performance requirements of the engine 10, 110. The modulating of air 6 between substantially zero air flow and a maximum discharge air flow is performed as required by varying a stagger of the inlet guide vanes 74, 174. In the exemplary embodiment, the inlet guide vanes 74, 174 are mechanically actuated by known actuators 75, 175 and operated by a known main engine control system (not shown). In alternative embodiments, the inlet guide vanes 74, 174 are operated by any suitable mechanism. Further, the exemplary method comprises the step of mixing the outer bypass flow 5 in an annular outer bypass passage 44,144 with a tip-flow 56 from the tip-fan 70, 170 in an annular inner bypass passage 42, 142 to create a mixed bypass flow 9. A blocker door 45, 145 located near the outer bypass passage 44, 144 is operated by modulating it between partially closed and substantially fully open positions so as to prevent a reverse flow in the outer bypass passage 144. Mechanical actuators operated by a known main engine control system (not shown) are used in the exemplary embodiment shown herein. The method described herein optionally comprises the step of operating a forward mixer 48, 148 of a known type to control the mixing of the outer bypass flow 5 and the tip-flow 56 and achieve a suitable static pressure balance. Further, the method comprises operating a rear mixer 94, 194 of a known type to control the operating characteristics of the forward fan stage 152 and the aft fan stage 160 and engine 10, 110 performance. The forward mixer 48, 148, rear mixer 94, 194, the blocker door 45, 145 and the inlet guide vanes 74, 174 are operated in a controlled manner using an engine control system (not shown) in order to optimize the operating characteristics and performance of the engine 10,110.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:
    a mechanically-driven forward fan stage configured to pressurize an airflow;
    a compressor; and
    an aft fan stage located axially aft from the forward fan stage, and axially forward from the compressor, the aft fan stage comprising a circumferential row of tip-fan blades adapted to pressurize a first portion of a pressurized air flow from the forward fan stage wherein the aft fan stage is driven by extraction of energy from a second portion of the pressurized air flow, wherein the aft fan stage rotates mechanically independently of the forward fan stage and the compressor.

2. A gas turbine engine according to claim 1, wherein the aft fan stage reduces the pressure of the second portion of the pressurized airflow from the forward fan stage.

3. A gas turbine engine according to claim 1, further comprising a circumferential row of inlet guide vanes located axially forward from the tip-fan blades.

4. A gas turbine engine according to claim 3, wherein the inlet guide vanes are variable vanes configured to modulate the flow of air to the tip-fan blades.

5. A gas turbine engine according to claim 1, further comprising an annular inner bypass passage adapted to flow an inner bypass flow and an annular outer bypass passage adapted to flow an outer bypass flow.

6. A gas turbine engine according to claim 5, further comprising a blocker door that is adapted to prevent a reverse flow in the outer bypass passage.

7. A gas turbine engine according to claim 1, further comprising an annular splitter located axially forward from the aft fan stage adapted to bifurcate a flow stream from the forward fan stage to form the first portion and the second portion of the flow.

8. A gas turbine engine according to claim 5, further comprising a forward mixer located downstream from the aft fan stage that is adapted to enhance mixing of the inner bypass flow and the outer bypass flow to form a mixed bypass flow.

9. A gas turbine engine according to claim 1, further comprising a rear mixer located down-stream from a low-pressure turbine that is adapted to enhance mixing of a hot exhaust from the low-pressure turbine and a relatively cooler flow.

10. A method of operating a gas turbine engine comprising the steps of:
    pressurizing an airflow using a mechanically-driven forward fan stage to generate a pressurized airflow;
    directing a first portion of the pressurized airflow towards a tip-fan of an aft fan stage; and
    expanding a second portion of the pressurized airflow in a circumferential row of air-turbine blades of the aft fan stage to drive the aft fan stage, such that the pressure of a core flow entering a compressor is reduced, wherein the aft fan stage rotates mechanically independently from the forward fan stage and the compressor.

11. A method according to claim 10, further comprising the step of modulating a flow of air entering the tip-fan with an inlet guide vane.

12. A method according to claim 11, further comprising modulating the flow of air between substantially zero air flow and a maximum discharge air flow.

13. A method according to claim 10, further comprising flowing an inner bypass flow in an annular inner bypass passage and flowing an outer bypass flow in an annular outer bypass passage.

14. A method according to claim 13 further comprising the step of operating a blocker door to prevent a reverse flow in the outer bypass passage.

15. A method according to claim 13, further comprising the step of mixing the outer bypass flow with a tip-flow from the tip-fan to create a mixed bypass flow.

16. A method according to claim 15 further comprising operating a forward mixer to control the mixing of the outer bypass flow and the tip-flow.

17. A method according to claim 10 further comprising operating a rear mixer to control the operation of the forward fan stage and the aft fan stage.

18. A method according to claim 17, further comprising operating a blocker door located near an outer bypass passage.

* * * * *